M. THOMPSON.
Treating Grain for Distillation.
No. 43,047.
Patented June 7, 1864.
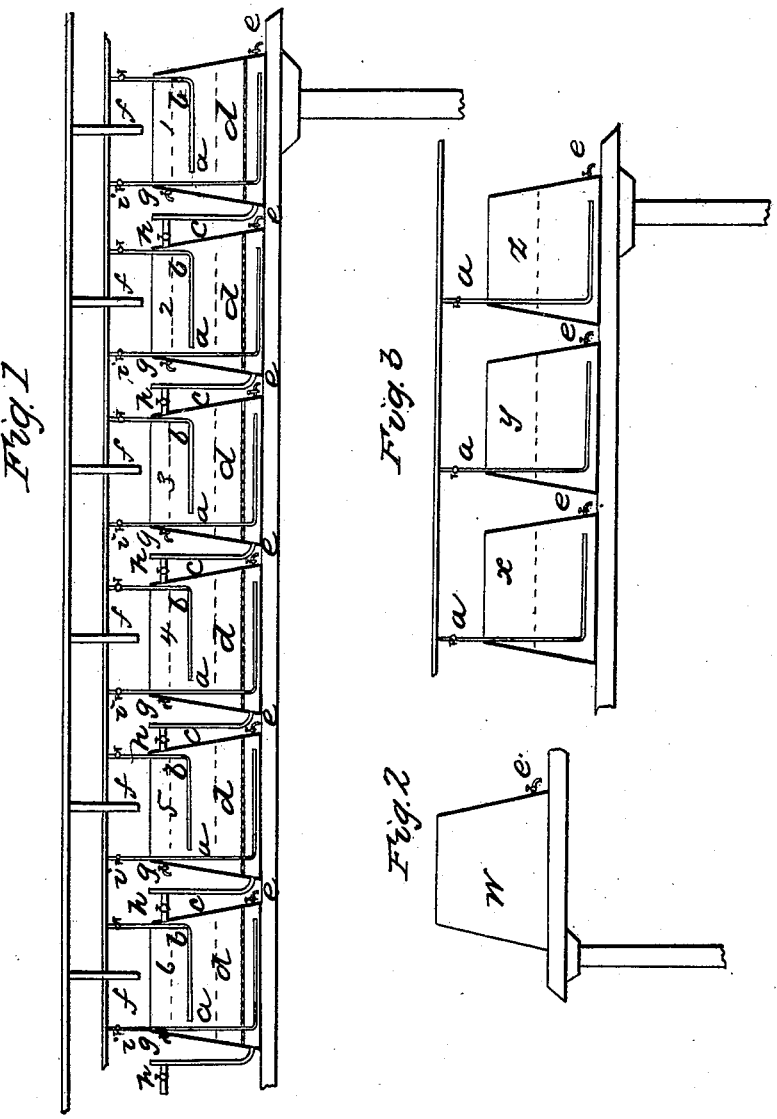
Witnesses
Inventor

UNITED STATES PATENT OFFICE.

MACKLOT THOMPSON, OF ST. LOUIS, MISSOURI.

IMPROVEMENT IN PREPARING AND TREATING GRAIN FOR DISTILLATION.

Specification forming part of Letters Patent No. 43,047, dated June 7, 1864.

*To all whom it may concern:*

Be it known that I, MACKLOT THOMPSON, of St. Louis, in the county of St. Louis and State of Missouri, have invented certain new and useful Improvements in Distilling Corn or other Cereals, Plants, or Tubercules; and I hereby declare that the following is a full, clear, and exact description of the same.

My invention relates to that part of the process of distillation which is commonly known as the "mashing" process. This was heretofore effected by first crushing or grinding the raw grain to meal, and by adding to it in the mash-tub crushed malt to favor the saccharine fermentation in the mashing. In some instances the whole of the grain was malted and crushed, mixed with and kept agitated in water maintained at a temperature varying from 150° to 160° Fahrenheit for from three to four hours.

My invention has for its object the cheapening of the manufacture of spirits, the increase of the yield thereof from a given quantity of vegetable matter, and the production of cleaner and better residue than could be done by any process heretofore practiced; and I have accomplished this by a new process or mode of distillation, whereby the grinding of the grain to be distilled is dispensed with, and the use of malt obviated; and my invention consists, first, in the process hereinafter described of macerating grains, roots, tubercules, and other vegetable matter capable of distillation by the employment of acids in connection with water at a high temperature; second, in the manner herein described of treating grain, &c., by submitting the same to the action of acidulated water, in combination with the appropriate degree of heat for the production of the maximum quantity of sugar; third, the method of working mashing-tubs with economy and efficiency by the employment of apparatus such as hereinafter described, and operating the same, continuously agitating and heating the matter by steam, applied in the manner and for the purposes hereinafter set forth.

To enable others to make and use my said invention, I shall now proceed to describe the manner in which the same is or may be performed.

I use a closed series of mashing-tubs somewhat larger at the base than at the top, and provided with a false bottom composed of a wooden trellis, upon which is placed a leaden perforated sheet to act as a strainer to the mass. From above and near the bottom of the tub springs a pipe extending upward and connecting by means of a side branch with the top of the next succeeding tub. In this way all the tubs composing the series are connected—that is to say, each tub is connected with its next preceding one by means of a pipe starting from the bottom of the latter and terminating at or near the top of the former. Each tub is also furnished with separate discharge-cocks—one on top communicating with the receiving-tubs and the other between the two bottoms—so that the contents may be drawn off when the work shall have acquired the requisite degree of density. An additional cock, $h$, may be placed on the branch pipe of the communicating tube, which may perform the functions of the first of the two discharge-cocks referred to, and enable the connecting of the tub to which it belongs with any other, should by accident or otherwise any intermediate tub get out of order. Along the series of tubs I arrange the main pipe of a steam-generator, from which main pipe branch pipes are carried into each mashing-tub. I prefer to use two pipes for each tub; but one or more may be used. The pipes in the tub are perforated and disposed horizontally, or in a plane parallel with the level of the liquid the tubs are to contain. If two be used, the one is placed between the two bottoms and the other in or about the middle of the tub. Each of the pipes is provided with a cock, so that supply of steam may be had at pleasure. Water-pipes communicating with a hot-water tank or boiler are arranged over each tub, whereby the water necessary for the operation is received.

In the drawing, I have shown in sectional elevation the apparatus just described.

In said drawing, 1 2 3 4 5 6 are the macerating or mashing tubs; W, a refrigerator commonly used in all distilleries, and in which the work drawn from the receiving-tubs is allowed to cool prior to fermentation. X Y Z are the receiving-tubs. These are also provided with steam-pipes for the purpose of maintaining the work at the requisite temperature. $a$ and $b$ are steam-pipes, and $d$ the false bottom in the macerating-tub. $c$ are the communication-pipes of the tubs; $e$, $g$, and $h$, discharge-cocks, and $f$ the hot-water pipes.

In an apparatus constructed and arranged substantially as before described, the operation is conducted in the manner as follows: I first commence to introduce in tub No. 1 a quantity of water as will be required to cover the amount of grain worked at one operation. The water is brought to a boiling-point by opening the steam-stock $i$ of the pipe $a$, and the grain is allowed to remain in contact with the boiling water for from four to six hours. When the grain is sufficiently cooked I add some sulphuric or hydrochloric acid to impart to the liquid a marked acidity. I would prefer to use from eight to ten per cent., in weight, of the latter and from two and one-half to three per cent. of the former. Hydrochloric acid is, however, used in preference to sulphuric or other acid, as its action is more uniform. I then introduce in the tub some more hot water, and cover it again and allow it to remain for about five hours. The proper temperature of the mass is now maintained by means of the steam-pipe $b$, the steam-pipe $a$ being shut, the effect of which is the reduction of the temperature to about 150° Fahrenheit, which has been found to be the best temperature for the purpose of obtaining the greatest quantity of sugar. While these operations are being effected in tub No. 1 tub No. 2 is prepared in a similar manner—that is to say, the requisite quantity of grain is put in water, so as to be perfectly covered by it. The cooking operations of the grain are also effected as described with respect to tub No. 1. The wort of tub No. 1 that shall have acquired the proper degree of density is drawn off into the receiver by the discharge-cock $c$, and the place of it is constantly supplied by fresh hot water, which becomes gradually charged with saccharine matter until it attains its maximum of density as it is drawn off; but if, during this operation, the liquid becomes less charged with saccharine matter, then the cock $c$ is closed, and the liquid is forced into tub No. 2, where, coming in contact with fresh wort and grain, it will soon attain that degree of density which is indicative of its being sufficiently charged with sugar. It may then be drawn off, as before described, from tub No. 2, and the same operations are repeated in each successive tub. The liquid insufficiently charged with saccharine matter of each preceding tub is used in the next succeeding one in the same manner as described with reference to tubs Nos. 1 and 2. When the grain is completely exhausted communication with the succeeding series of tubs is stopped, the supply of steam is arrested, and the waste-cock $e$ is opened to allow the tubs to be emptied of the waste water. The residue which remains on top of the filter is removed, and may be used for feeding cattle or live stock.

I may work the series in sections of three or four or more tubs simultaneously. To this effect I commence the operation by preparing three, four, or more at once, in immediate succession. When in tub No. 1 the wort shall have acquired the proper degree of density the whole operation in that tub is suspended until tubs Nos. 2 and 3, or the series of the section, arrive to the same state of development. I then keep up a stream of water into tub No. 1, which forces the wort to pass through all the tubs of the section and discharge the wort at the last tub of the said section, and this is going on until the wort thus drawn maintains the requisite degree of elasticity. When the grain is exhausted throughout the tubs of the section the whole operation is stopped, and the work is proceeded with on the following section, which had been previously prepared, as described.

Any excess of acid in the receiving-tub may be neutralized by the addition of some alkaline matter.

Having thus described my invention, I claim—

1. The process hereinbefore described of macerating grain, roots, tubercules, and other vegetable matter capable of furnishing alcoholic spirits by the employment of acids in connection with water at a high temperature.

2. The manner herein described of treating grain, &c., by submitting the same to the action of acidulated water, in combination with the appropriate degree of heat for the production of the maximum quantity of sugar.

3. The method of working mashing-tubs by the employment of apparatus such as described, and operating the same in continuous series or in sections, substantially in the manner herein described.

4. The method of effecting the maceration of grain, &c., by apparatus such as herein described, and operating the same by steam, applied in the manner and for the purposes set forth.

In testimony whereof I have signed my name to this specification before two subscribing witnesses.

MACKLOT THOMPSON.

Witnesses:
A. POLLAK,
EDM. F. BROWN.